Aug. 9, 1932. A. G. FITZ GERALD 1,870,561
PNEUMATIC TUBE AND METHOD OF MAKING SAME
Filed April 11, 1929
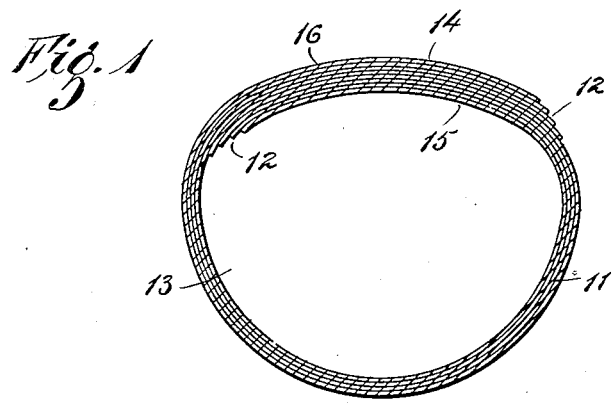
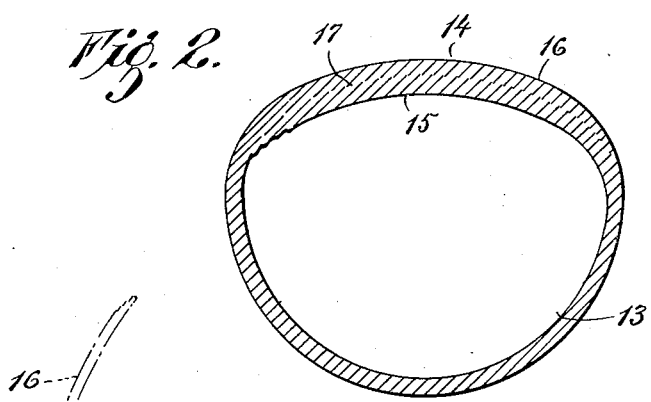
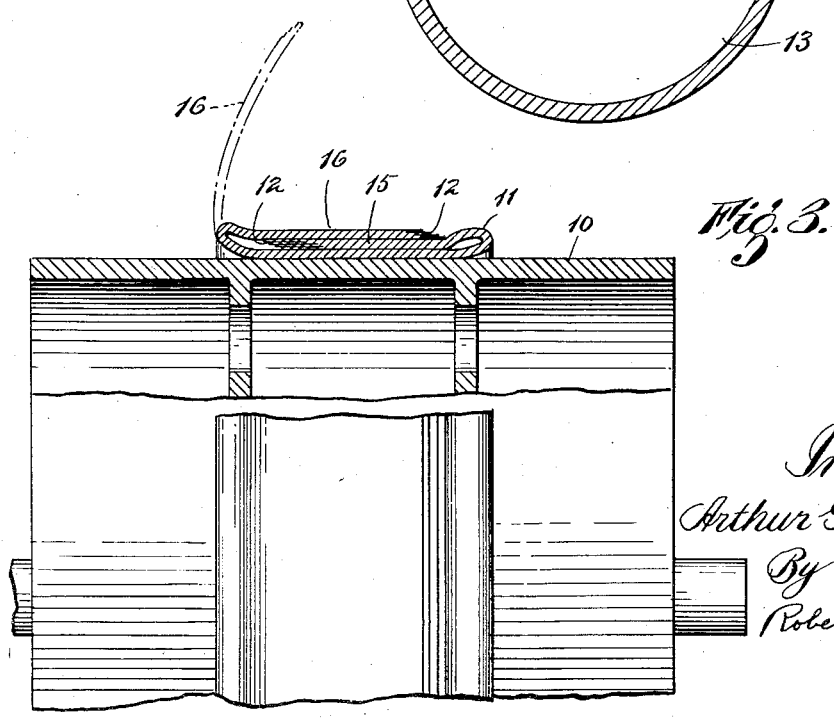
Inventor,
Arthur G. Fitz Gerald
By Robert M. Pierson,
Atty.

Patented Aug. 9, 1932

1,870,561

UNITED STATES PATENT OFFICE

ARTHUR G. FITZ GERALD, OF BROOKLINE, MASSACHUSETTS

PNEUMATIC TUBE AND METHOD OF MAKING SAME

Application filed April 11, 1929. Serial No. 354,202.

This invention relates to the construction of rubber tubes, and especially puncture-sealing tubes for pneumatic tires, of the type having a relatively-thick tread wall adapted to be placed under compression by inflation to service pressure in the outer casing.

My object is to reduce the cost of manufacture and provide a relatively-light and durable tube of this type adapted to perform its functions with a smaller number of separate component parts than have heretofore been commonly employed in making compression tubes.

The invention is particularly adapted for use in connection with tubes vulcanized in endless form in a mold. The reduction in cost and number of separate parts is accomplished by overlapping the margins of the tube-making strip in a longitudinal seam for a width substantially equal to the width of the tread wall, thus dispensing with the usual tread-thickening strip as a separate member, eliminating the operations formerly required to produce and apply such separate strip, and securing an air-retaining compression-wall seam of increased strength. Other features of improvement will appear in the detailed description.

Of the accompanying drawing, Fig. 1 is a transverse section of the raw, formed tube made according to my invention, substantially as it would appear if slightly inflated.

Fig. 2 is a similar section of the vulcanized tube in molded form.

Fig. 3 is a front elevation partly in section showing a portion of the tube-building drum with the formed tube thereon.

In practicing my invention, I prefer to employ, so far as they are applicable, the steps and apparatus commonly used in making drum-built tubes of the ordinary type, but to vary such procedure in the particulars required to accomplish the new results.

Referring to Fig. 3, 10 is a cylindrical drum or pulley on which is mounted an endless strip or band 11 of vulcanizable rubber compound. This strip may be produced in endless form before being brought to the drum, or it might be built up in endless form on the drum by winding a thinner strip of the necessary width in overlying convolutions or laminations, or it could be made by wrapping a strip of rubber in a single turn on the drum and overlapping its ends in a transverse seam, the latter being the method more commonly employed in making moldable inner tubes of the ordinary type. When the strip 10 is made from calendered stock, I prefer to produce it in a plurality of thicknesses or laminations, as indicated in Fig. 1 and partially indicated in Fig. 3, and to arrange the edges of the plies in stepped formation in accordance with the usual practice as indicated in the drawing, so as to taper or bevel the edges 12 of the strip 11 in the same direction and thus avoid abrupt shoulders at said edges.

The width of the strip or band 11 is sufficient to make a tube 13 of the desired cross section plus an additional amount substantially equal to the width of the tread wall 14 of said tube, as shown in Figs. 1 and 2.

The strip 11 having been laid up in endless band form on the drum 10, the middle circumferential zone of its outer surface is brushed with a liquid composition to prevent adhesion of the folded-over margin, and one margin of said strip, in this instance the right-hand one 15, is then folded over on the middle portion. The other margin 16 is then folded over on the margin 15 for a width equal to the width of the tread wall, the tacky, rubber surfaces are caused to adhere, and the second margin is pressed down against the first one with a suitable rolling tool. The valve patch may be applied at the inner periphery of the rubber wall at any suitable stage, preferably on the outer surface of the strip 11 which is to form the interior surface of the tube, before the margins are folded over, said patch and the tube wall being suitably perforated to receive the valve.

If the tread wall of the tube is to have a reinforcement of fabric to restrict its lateral expansion in service, such strip may be applied to and rolled down on the outer periphery while the raw tube is still on the drum.

The raw tube having thus been formed on the drum 10, it is then removed therefrom, placed in a suitable vulcanizing mold and cured in said mold while inflated with a pressure fluid such as compressed air, steam or carbonic acid gas. The shape of the mold cavity is preferably such as to vulcanize the tread wall 14 in transversely-flattened form, either slightly convex as shown, or perfectly flat, or slightly concave, and of a circumferential length approximating that of the crown of the tube-receiving cavity in the tire casing; while its belly is molded substantially in the arc of a circle and of an inner peripheral length considerably greater than that of the tube seat between the casing beads, so that when the tube is inflated in service, its inner periphery will be drawn radially inward, and the margins of its tread wall 14 similarly drawn inwardly and toward each other, and said tread wall placed under compression and thus made capable of sealing puncture holes.

The adjoining plies 15, 16 of the tread wall become firmly united by adhesion and vulcanization in an air-tight seam 17 possessing great strength and durability because of the large area of contact between the integral marginal extensions of the side wall forming said plies, and there is but small opportunity for failure caused by defective workmanship. The stepping of the edge 12 of the overlying margin 16 of the strip 11 is effaced by flow of the rubber during vulcanization, so that the tube has a smooth outer surface at this as well as other external portions, and the beveling of both edges produces a gradual tapering of the thicker tread wall 14 into the thinner side walls at the shoulders of the tread wall, which permits the necessary flexing at these points without starting cracks in the rubber.

Having found that a compression tread wall of only double the average thickness of the stock employed in inner tubes of the ordinary type is ample to secure substantial puncture-sealing qualities in a tube shaped and related to the casing as herein described, my invention enables me to produce a relatively-light and strong compression-tread tube without employing a separate, tread-thickening strip, and to dispense with the operations required in producing and applying such separate strip. The labor cost is substantially no greater than that required in producing ordinary molded tubes, and the compression feature is obtained at the expense of only a small amount of additional rubber compound.

The described steps and features may be varied without departing from the scope of my invention as defined in the claims.

I claim:

1. The method of making endless, pneumatic-tire tubes which comprises forming an endless band of vulcanizable rubber compound with one edge tapering from its inner side toward the opposite edge, bringing the margins of said band into overlapping relation over the middle portion thereof, in a longitudinal seam, for a width substantially equal to the width of the tread wall of the tube, to form said tread wall, with said tapered edge entirely underneath, the overlapping margin and vulcanizing the tube.

2. The method of making endless, pneumatic-tire tubes which comprises wrapping on a form an endless band of vulcanizable rubber compound of a thickness which, when doubled, will provide a puncture-sealing tread wall, bringing one margin of said band over the middle thereof, bringing the other margin over the first margin and overlapping said margins for a width substantially equal to the width of the tread wall of the tube to be formed, to make a seam of said width, pressing down the second margin upon the first for the width of said seam, and vulcanizing the tube.

3. The method of making endless pneumatic-tire tubes which comprises producing a laminated band of vulcanizable rubber compound with stepped edges tapered in the same direction, bringing the margins of said band into overlapping relation for a width substantially equal to the width of the tread wall of the tube to form said tread wall with shoulders tapering into the side walls, and vulcanizing the tube.

4. The method of making endless, pneumatic-tire, compression-tread tubes which comprises forming a band of vulcanizable rubber compound with edges tapered in the same direction, bringing the margins of said band into doubled overlapping relation for a width substantially equal to the width of the tread wall, to form said tread wall with shoulders tapering into the side walls, and vulcanizing said tube in a mold under internal fluid pressure, with its tread wall in transversely-flattened condition.

5. A pneumatic-tire rubber tube having, when inflated, a tread wall of double the thickness of the side walls in the middle of said tread wall and tapering at the edges thereof, formed by integral tapered marginal extensions of said side walls overlapped in a seam of substantially the same width as said tread wall.

6. A pneumatic-tire, compression-tread, endless, rubber tube having a transversely-flattened puncture-sealing tread wall formed by integral, laminated, marginal extensions of the side walls overlapped and vulcanized together for a width substantially equal to the width of the tread wall and having stepped beveled edges for tapering the shoulders of said tread wall into the side walls In witness whereof I have hereunto set my hand this 8th day of April, 1929.

ARTHUR G. FITZ GERALD.